United States Patent [19]
Quigley

[11] 4,145,834
[45] Mar. 27, 1979

[54] ANIMAL TRAP

[76] Inventor: John R. Quigley, Box 836, Helena, Mont. 59601

[21] Appl. No.: 840,755

[22] Filed: Oct. 11, 1977

[51] Int. Cl.² .......................................... A01M 1/12
[52] U.S. Cl. .................................................... 43/73
[58] Field of Search ............................ 43/64, 73, 74

[56] References Cited

U.S. PATENT DOCUMENTS

| | | | |
|---|---|---|---|
| 982,001 | 1/1911 | Hardegen | 43/73 |
| 2,107,080 | 2/1938 | Mitchell | 43/64 |
| 2,534,750 | 12/1950 | Almond | 43/73 |

FOREIGN PATENT DOCUMENTS 76067 10/1947 Czechoslovakia ........................ 43/74

Primary Examiner—Jimmy C. Peters
Attorney, Agent, or Firm—Price, Heneveld, Huizenga & Cooper

[57] ABSTRACT

An animal trap of the type including an open top vessel suitable for trapping or drowning an animal is disclosed. The animal is attracted to a fixed platform disposed above the open top vessel. A thrust plate, set to sweep across the platform, is disposed above the vessel. A trigger sensitive to the presence of the animal is disposed on the platform. The trigger is operably connected to the thrust plate so that upon sensing the presence of the animal on the platform, the thrust plate is released, thereby sweeping the animal off the platform and into the vessel where the animal is trapped or drowned.

9 Claims, 4 Drawing Figures

ANIMAL TRAP

BACKGROUND OF THE INVENTION

The invention relates generally to animal traps and more specifically to a rodent or mouse trap.

Animal traps of the type including an open top vessel in which an animal is trapped or drowned are known in the prior art. These prior art traps generally employ a bait or weight activated trap door for dropping the animal into the open top vessel. Because of cost and practical manufacturing considerations, trap door devices often do not provide a secure platform for receiving the animal to be trapped. This has presented a problem because of the natural reluctance of any animal to completely trust its weight to a platform that is not solid or securely fixed. For these reasons, prior art devices employing a trap door for dropping the animal into an open top vessel have met with only limited success.

Bait activated trap door devices suffer from the further disadvantage that during the trapping of one or more animals, the bait is often depleted, necessitating periodic rebaiting and often resetting of the trap.

Thus it is a principle object of the present invention to provide an animal trap of the type including an open top vessel for trapping or drowning an animal wherein there is never a need for the animal to trust its weight to an unstable platform.

It is a further object of the present invention to provide an animal trap wherein several animals may be sequentially trapped or drowned without periodic rebaiting or resetting of the trap.

SUMMARY OF THE INVENTION

These and other objects of the invention are carried out by the steps of attracting an animal to be trapped to a fixed platform disposed above an open top vessel suitable for trapping the animal, sensing the presence of the animal on the platform and sweeping or thrusting the animal off the platform and into the vessel.

An animal trap constructed according to the invention icludes an open top vessel suitable for trapping the animal with a fixed platform for receiving the animal disposed above the vessel. Means for sweeping or thrusting the animal comprising a thrust plate or the like is set to sweep across the fixed platform. Triggering means sensitive to the presence of the animal on the platform is operably connected to the means for thrusting to trip the means for thrusting upon the sensing of the animal and thereby sweep the animal off the platform into the open top vessel. In preferred embodiments, the triggering means comprises a pivoting teeter-totter, a magnet disposed on one end of the teeter-totter and a reed switch disposed on the platform adjacent the magnet whereupon pivoting of the teeter-totter section by contact with the animal brings the magnet into close proximity with and closes the reed switch. Closing of the reed switch supplies power to a thrust solenoid for a predetermined time period actuating the thrust plate and sweeping the animal into the vessel. In preferred embodiments, the animal trap is embodied in a portable, hand carried, three compartment enclosure.

With the present invention, the foregoing problems associated with trap door devices are eliminated by provision of a fixed or solid platform for receiving the animal disposed above the open top vessel. Since the means for thrusting the animal off the platform is activated by contact with the animal, depletion of the bait is not a problem. Furthermore, triggering and thrusting means may be easily automated for sequentially and automatically receiving and trapping a plurality of animals.

DESCRIPTION OF THE PREFERRED EMBODIMENT

Simply stated, the present invention involves three basic operations: (1) attracting an animal to a fixed platform above an open top vessel suitable for trapping the animal, (2) sensing the presence of the animal on the platform and (3) sweeping or thrusting the animal off the platform and into the vessel where the animal is trapped or drowned.

Figure 1:
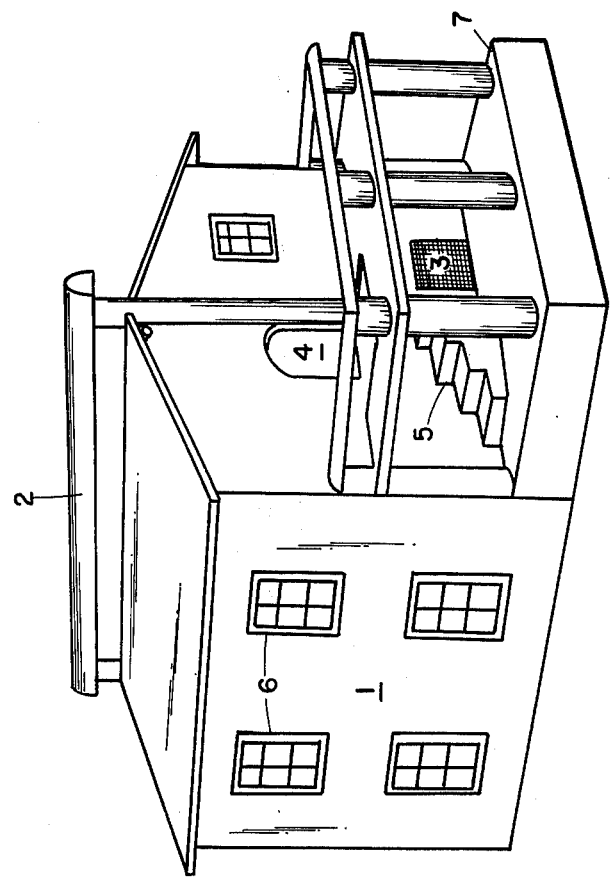
FIG. 1 is a perspective view of the preferred embodiment of the invention.

Referring to FIG. 1, a portable, hand-carried enclosure 1 embodying the animal trap of the present invention is illustrated. The enclosure 1 includes a handle 2 to facilitate handling of the enclosure. The enclosure includes a first screened in bait section 3 for initially attracting the animal to the device. An entrance such as the one illustrated at 4 is provided on an upper level in the enclosure with steps 5 leading thereto. In the present case, the enclosure 1 is constructed from wood secured with nails and glue and fashioned with windows 6 and porch 7, to have an outward exterior pleasing to the eye, resembling a small house or hotel. Of course, the enclosure 1 may be constructed from any suitable material and may take any desirable shape. For example, in other embodiments, the enclosure may be formed from snap-together or glued together plastic members. The exterior of the enclosure may take any desirable shape except that steps 5 or the like need be provided to provide the animal with access to entrance 4 on an upper level of the enclosure.

Figure 2:
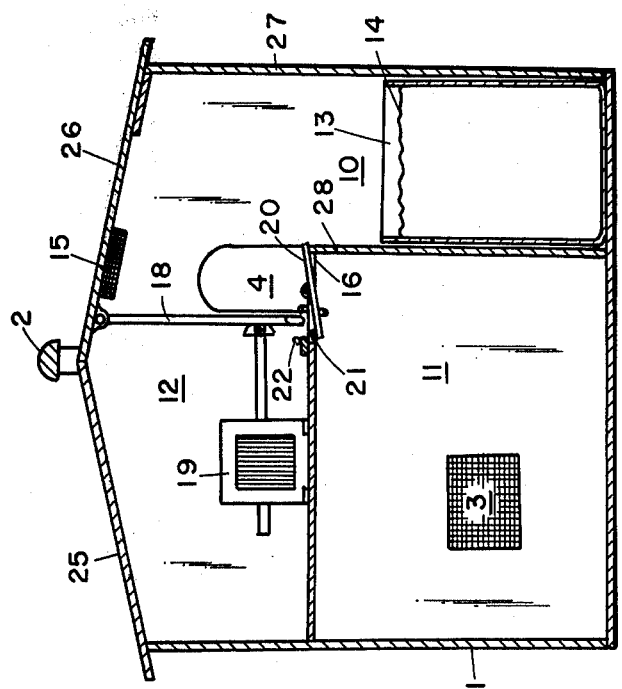
FIG. 2 is a vertical section of the embodiment of the invention illustrated in FIG. 1.

Referring now to FIG. 2, a vertical section of the portable, hand-carried enclosure 1 is illustrated. The enclosure 1 includes three compartments comprising a first lower open top compartment 10, a second lower compartment 11, and an upper compartment 12 communicating with the first lower open top compartment 10. The first lower open top compartment 10 serves as an open top vessel for trapping an animal and in this case includes a plastic vessel or the like 13 filled with a suitable liquid 14 such as water, where the animal is drowned. The second lower compartment 11 serves as a first bait section having screened opening 3 for initially attracting the animal to the device. The second lower compartment 11 also houses electrical components of the invention not illustrated in FIG. 2.

The upper compartment 12 includes a second screened-in bait section 15 for attracting the animal through entrance 4 onto platform 16. The upper compartment 12 also includes means for sweeping or thrusting an animal comprising a pivoted thrust plate 18 set to sweep across the platform 16 and a spring biased thrust solenoid 19. Triggering means including a teeter-totter section 20, a magnet 21 and a reed switch 22 are disposed on the platform 16 for sensing the presence of an animal thereon. The triggering means is operably connected to the means for thrusting the animal such that upon contact with an animal on the platform 16, the thrusting means sweeps the animal off the platform and into the vessel 13 where the animal is trapped or drowned.

The roof sections 25 and 26 of the enclosure 1 are preferably removable to allow access to the thrusting and triggering means housed in upper compartment 12 and to allow rebaiting of screened in bait section 15. The wall 27 is preferably removable to allow access to lower compartments 10 and 11 and removal of container 13 containing the trapped or drowned animals. Inner wall 28 is preferably removable to allow rebaiting of the first bait section housed in lower compartment 11 and to allow access to the electrical components housed therein.

Figure 3:
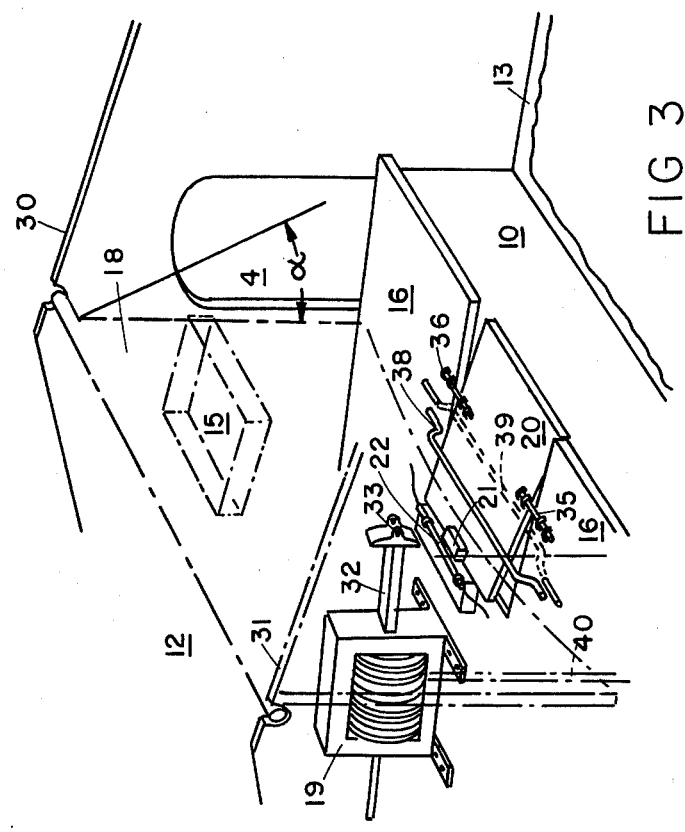
FIG. 3 is a perspective view of the thrusting means and triggering means of the present invention.

Referring now to FIG. 3, a perspective view of the compartment 12 including additional detail of the aforementioned thrusting and triggering means is illustrated. The thrusting means set to sweep across the platform 16 includes a pivoted thrust plate 18 journaled in walls 30 and 31. The thrust plate 18 is initially disposed in a generally vertical orientation and is pivoted about its upper end. The thrust plate extends all the way across the platform 16, extending between walls 30 and 31, and is relieved along its bottom edge to clear the triggering means disposed on platform 16. The thrusting means also includes means for translating the thrust plate comprising a spring biased thrust solenoid 19 having a linear actuating arm 32 pinned to a slotted tab (not shown) in the thrust plate 18 at 33. Actuation of the thrust plate 18 by solenoid 19 moves the pivoting thrust plate through an angle α sufficient to sweep or thrust an animal resting on platform 16 into vessel 13. The thrust solenoid 19 is spring biased to automatically return the thrust plate 18 to the position illustrated in FIG. 3 after actuation of the thrust plate.

The triggering means disposed on the platform 16 includes a pivoted teeter-totter section 20 in the platform 16, the pivoted teeter-totter section 20 being journaled in the platform 16 at 35 and 36. A magnet 21 is disposed on one end of the teeter-totter section 20 adjacent a reed switch 22 mounted on the platform 16. The triggering means further includes wire stops 38 and 39 disposed on the top and bottom of the teeter-totter section 20, respectively. The stops are so disposed to prevent excessive oscillations of the teeter-totter section 20 and interference between the teeter-totter section 20 and the pivoted thrust plate 18. The magnet 21 and the pivot points 35 and 36 of the teeter-totter section 20 are disposed such that the end of the teeter-totter including the magnet 21 is the heavier of the two ends of the teeter-totter. Thus the teeter-totter section 20 normally rests on the lower wire stop 39 placing the end of the teeter-totter including the magnet 21 at its lowermost position, spaced from the reed switch 22. This position is opposite to that depicted in FIG. 3. FIG. 3 illustrates the teeter-totter section 20 resting against the upper wire stop 38 placing the end of the teeter-totter including the magnet 21 at its highest position adjacent the reed switch 22. The balance of the teeter-totter 20 is such that an animal on the fixed platform 16 on either side of the teeter-totter need only place a paw on the teeter-totter to test its weight carrying ability or brush against it in an effort to reach the bait in the wire cage suspended above in order to disturb the balance of the teeter-totter and bring the magnet 21 adjacent the reed switch 22 as depicted in FIG. 3.

As is well known to those skilled in the art, the reed switch 22 is a type of switch including a flexible ferrous element which is attracted to the magnet 21 closing the switch whenever the magnet is brought adjacent thereto. When contact by an animal on the platform 16 with the teeter-totter 20 brings the magnet 21 adjacent to reed switch 22, the reed switch is closed by the magnet and attendant triggering circuitry (not illustrated in FIG. 3) directs power to the thrust solenoid 19 actuating the pivoted thrust plate 18 and sweeping the animal into the open top vessel 13. FIG. 3 also illustrates in phantom at 40 that a second entrance to the platform 16 may be provided on the side of the teeter-totter section 20 opposite from the entrance 4.

Figure 4:
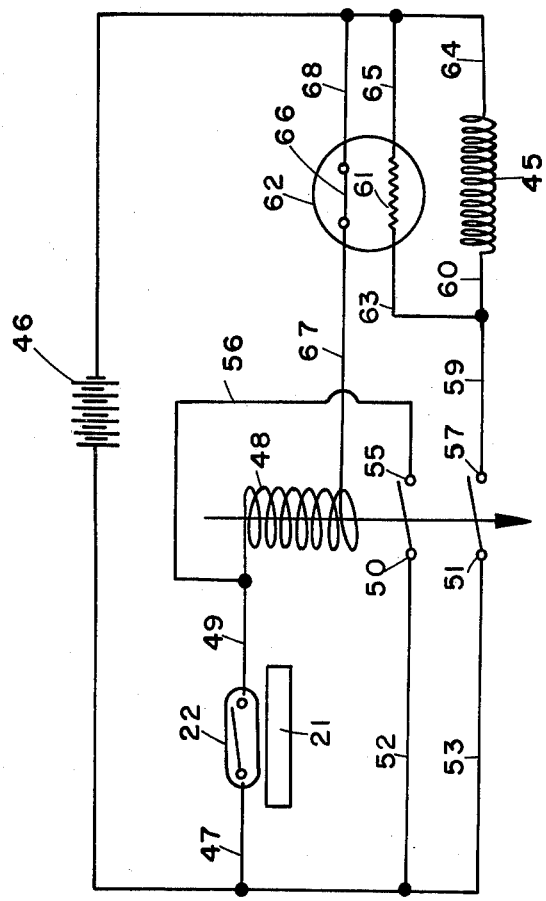
FIG. 4 is an electical schematic for the thrusting means and triggering means of the present invention.

Referring now to FIG. 4, the remaining electrical components associated with the triggering means are illustrated in schematic form. The magnet and reed switch are schematically illustrated at 21 and 22, respectively. The actuating coil of the thrust solenoid 19 is schematically illustrated at 45. A power supply is schematically illustrated at 46 as a battery but it is to be understood that ordinary house current at 110 VAC and 60 Hz is normally used making the trap a plug-in appliance. The reed switch 22 is connected to the power supply 46 through line 47 and to the actuating coil of a normally open double pole double throw relay 48 through line 49. Terminals 50 and 51 of relay 48 are connected to power supply 46 through conductors 52 and 53, respectively. Terminal 55 of relay 48 is connected to the actuating coil of relay 48 by conductor 56. Terminal 57 of relay 48 is connected to the actuating coil 45 of thrust solenoid 19 by conductors 59 and 60 and to the heating coil 61 of a normally closed delay relay 62 by conductors 59 and 63. The actuating coil 45 of thrust solenoid 19 and the heating coil 61 of the delay relay 62 are further connected to ground through conductors 64 and 65, respectively. The normally closed switch 66 of delay relay 62 is connected in series with reed switch 22 and actuating coil of relay 48 by conductor 67. The normally closed switch 66 of delay relay 62 is further connected to ground by conductor 68.

In the operation of the circuit illustrated in FIG. 4, contact between the animal and the teeter-totter brings the magnet 21 adjacent the reed switch 22 closing the reed switch and supplying power to the actuating coil of normally open double pole double throw relay 48. Once closed, double pole double throw relay 48 provides a source of power for the actuating coil of the relay 48 through terminal 55 and conductor 56. This insures that the contacts of relay 48 will not bounce open and closed with the movements of the teeter-totter. Simultaneously with the application of power to the actuating coil of relay 48, power is supplied to the actuating coil 45 of thrust solenoid 19 and to the heating element 61 of delay relay 62. This actuates the thrust solenoid, sweeping the animal from the platform into the open top vessel trapping or drowning the animal therein. The application of power to the heating element 61 of delay relay 62 causes a bimetallic element in the normally closed switch 66 of the delay relay to gradually warm and open the switch 66 after a predetermined time period. Since the switch 66 of delay relay is connected in series with the actuating coil of double pole double throw relay 48, opening of the delay relay 62 opens double pole double throw relay 48 terminating power to the actuating coil 45 of thrust solenoid 19 allowing the pivoted thrust plate 18 to return to its set position, awaiting the entrance of another animal. Delay relay 62 allows the thrust plate to remain actuated for approximately five seconds, a time that has been found sufficient to allow the teeter-totter to come to rest spacing the magnet 21 from the reed switch 22.

Where the power supply 46 is 110 VAC 60 Hz, a suitable delay relay for use at 62 is an Amperite Thyron 5 second delay relay number 115 C10 and a suitable relay for use as double pole double throw relay 48 is manufactured by Allied Electronics, Inc., Model No. ASD 0504. A thrust solenoid suitable for use at 19 is a Guardian Electric 18 PAC-C A420 06349308 solenoid. It should be noted of course that different components may be employed with a different power supply and that solid state circuitry may replace the components presently disclosed.

In the operation of the animal trap illustrated in FIGS. 1–4, the user first places a suitable bait (such as cheese or peanut butter for rodents) within the first and second bait sections behind screened in section 3 in second lower compartment 11 and screened in section 15 in upper compartment 12, respectively. The user then places the device in an area frequented by the animals to be trapped and turns on the device. If it is desired merely to trap the animals, the trap may be operated dry. If it is desired to kill the animals, the open top vessel 13 may be filled with a suitable liquid such as water. Eventually, the lower screened in bait section 3 will attract the animals to the device and the upper screened in bait section 15 will attract the rodents up the steps 5 on the exterior of the enclosure 1 through the entrance illustrated at 4 in FIG. 1 or a suitable entrance on the opposite side of enclosure 1. Once inside the upper compartment 12 of enclosure 1, the animal will sit secure on fixed platform 16. Although any animal has a natural instinct to avoid stepping on a surface which will not support its weight, a mere curious brush of the paw will upset teeter-totter section 20 bringing magnet 21 into close proximity with reed switch 22 which supplies power to the thrust solenoid 19 for a predetermined time period as previously discussed with respect to the operation of the circuit illustrated in FIG. 4. The application of power to the thrust solenoid 19 sweeps pivoted thrust plate 18 across platform 16 thrusting or sweeping the animal residing thereon into open top vessel 13 wherein the animal is trapped or drowned. After expiration of a predetermined time period to allow the teeter-totter section 20 to come to rest, power is removed from thrust solenoid 19 which is spring biased such that pivoting thrust plate 18 is then reset to again sweep across platform 16 upon the entrance of another animal.

It is through the provision of a fixed platform 16 where the animal may sit secure in the knowledge that the platform will support its weight that the present device solves the principle disadvantage of prior art trap door animal traps. With the present invention the animal need no longer trust its entire weight to an insecure trap door to be placed into a position where it may be flipped into the open top vessel where it is trapped or drowned. Furthermore, the action of the pivoted thrust plate is easily automated by a weight actuated thrust solenoid so that the animal need never touch and spoil the bait and the trap may automatically sequentially trap a plurality of animals.

Although the invention may be applicable to many types of animals, the invention has been found to have particular utility in the trapping of rodents such as common rats or mice. The size of the trap and the type of bait used may be geared to the size and type of animal it is desired to trap. The approximate overall size of a trap found suitable for use for trapping common mice has a length of 14 inches measured across the porch front of the enclosure 1 illustrated in FIG. 1, a depth of 10 inches and a height of 15 inches.

Of course, other modifications may occur to those skilled in the art and it is desired to cover all of such modifications as may legitimately come within the scope of the appended claims.

The embodiments of the invention in which an exclusive property or privilege is claimed are defined as follows:

1. An animal trap comprising:
   an open top vessel suitable for trapping an animal;
   a fixed platform for receiving the animal disposed above said vessel;
   means for sweeping the animal set to sweep across said platform; and
   triggering means disposed on said platform, said triggering means comprising:
   (i) a pivoting teeter-totter section in said platform, said teeter-totter section pivoting upon contact by the animal;
   (ii) a magnet disposed on one end of said teeter-totter section; and
   (iii) a reed switch disposed on said platform adjacent said magnet, whereupon pivoting of said teeter-totter section brings said magnet into close proximity with and closes said reed switch;
   said triggering means being sensitive to contact with the animal on said platform, and said triggering means being operably connected to said means for sweeping to trip said means for sweeping upon contact with the animal on said platform and thereby sweep the animal off said platform into said vessel where the animal is trapped.

2. The animal trap of claim 1 wherein said vessel is filled with liquid to thereby drown the animal when the animal is swept off said platform.

3. The animal trap of claim 1 wherein said means for sweeping the animal comprises a pivoting thrust plate.

4. The animal trap of claim 1 wherein said means for sweeping the animal comprises:
   a generally vertical thrust plate extending the full length of said platform; and
   means for translating said thrust plate from side-to-side across said platform thereby sweeping the animal off said platform and into said vessel.

5. The animal trap of claim 1 wherein said means for sweeping the animal comprises:
   a vertically oriented thrust plate extending the full length of said platform, said thrust plate having its lower end initially disposed to one side of said platform, said thrust plate being pivotable about its upper end; and
   a thrust solenoid connected to said thrust plate, said thrust solenoid upon actuation sweeping the lower end of said pivotable thrust plate from side to side across said platform thereby sweeping the animal off said platform and into said vessel.

6. The animal trap of claim 1 wherein said platform is disposed above and to one side of said vessel, said platform having said triggering means disposed on the center thereof and said platform further including access means for the animal on either end thereof.

7. The animal trap of claim 1, wherein said means for sweeping comprises a pivoting thrust plate actuated by a thrust solenoid, said thrust solenoid being operably connected to said reed switch whereupon closing of said reed switch power is directed to said thrust solenoid.

8. The animal trap of claim 7 further including a delay relay connected to said reed switch and to said thrust solenoid, whereupon closing of said reed switch, said relay allows power to be directed to said thrust solenoid for a predetermined time period thereby actuating said thrust plate for the time period and resetting said thrust plate for another animal at the end of the time period.

9. An animal trap embodied in a portable hand-carried three compartment enclosure comprising:

an open top vessel suitable for trapping an animal;

a fixed platform for receiving the animal disposed above said vessel;

means for sweeping the animal set to sweep across said platform;

triggering means disposed on said platform, said triggering means being sensitive to contact with the animal on said platform, and said triggering means being operably connected to said means for sweeping to trip said means for sweeping upon contact with the animal on said platform and thereby sweep the animal off said platform into said vessel where the animal is trapped;

a first lower open top compartment serving as said vessel;

a second lower compartment including a first bait section that is inaccessible to the animal; and an upper compartment communicating with said first lower compartment, said upper compartment being accessible to the animal and said upper compartment including:

(i) said platform;
(ii) said means for sweeping,
(iii) a second bait section for attracting the animal to said platform, and
(iv) said triggering means.

* * * * *